United States Patent Office 3,763,218
Patented Oct. 2, 1973

3,763,218
ESTERS OF PHENYLALANINE
Ado Kaiser, Neu-Frenkendorf, Switzerland, and Hermann Bretschneider and Kraft Hohenlohe-Oehringen, Innsbruck, Austria, assignors to Hoffmann-La Roche Inc., Nutley, N.J.
No Drawing. Filed Apr. 28, 1971, Ser. No. 139,297
Claims priority, application Switzerland, May 6, 1970, 6,806/70
Int. Cl. C07c 103/30
U.S. Cl. 260—471 A          3 Claims

ABSTRACT OF THE DISCLOSURE

The compound α-amino-3-phenyl propionic acid and ethane derivatives wherein the phenyl ring is substituted with a formyl group useful as a hypotensive and appetite inhibiting agent.

SUMMARY OF THE INVENTION

In accordance with this invention, it has been discovered that compounds of the formula:

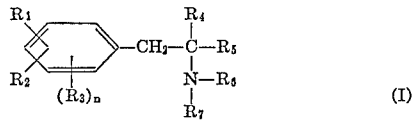

wherein one of $R_1$ or $R_2$ is formyl and the other of said $R_1$ or $R_2$ is hydroxy, lower alkoxy or substituted lower alkoxy which can be either ortho or para to said formyl; $R_3$ is hydrogen, hydroxy, lower alkoxy, lower alkanoyloxy, aroyloxy, lower alkyl or halogen, $R_4$ is hydrogen, or lower alkyl; $R_5$ is hydrogen, carboxyl, lower alkoxycarbonyl, amino carbonyl or mono or di-(lower alkyl) substituted amino carbonyl, $R_6$ is hydrogen, lower alkyl, lower alkanoyl or aroyl; $R_7$ is hydrogen or lower alkyl; and $n$ is an inteegr from 1 to 3; as well as the salts and optical antipodes thereof are useful as hypotensive and appetite inhibiting agents.

The compounds of Formula I can be prepared by formylating a compound of the formula:

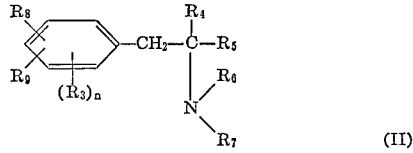

wherein $n$, $R_3$, $R_4$, $R_5$, $R_6$ and $R_7$ are as above; $R_8$ and $R_9$ are ortho or para to each other, with one of $R_8$ or $R_9$ being hydrogen and the other of said $R_8$ or $R_9$ being hydroxy, lower alkoxy or substituted lower alkoxy;

and salts thereof.

DETAILED DESCRIPTION OF THE INVENTION

As used herein, the term "halogen" includes all four halogens, i.e., bromine, chlorine, iodine, and fluorine, with chlorine being preferred. The term "lower alkyl" comprehends both straight and branched chain saturated hydrocarbon moieties having from 1 to 6 carbon atoms, such as methyl, ethyl, propyl, i-propyl, t-butyl, hexyl and the like, with methyl and ethyl being preferred. The term "lower alkoxy" comprehends moieties which can be designated-O-(lower alkyl), wherein lower alkyl is defined as above. Among the lower alkoxy moieties are included methoxy, ethoxy, propoxy, isopropoxy and the like, with methoxy and ethoxy being preferred.

The term "lower alkanoyl" comprehends residues of lower alkane carboxylic acids having from 1 to 6 carbon atoms such as acetyl, butyryl, caproyl and the like with acetyl being preferred.

The terms "aroyl" includes aroyl moieties containing from 7 to 11 carbon atoms such as benzoyl or naphthoyl. The preferred aroyl radical is benzoyl. The term "alkyl substituted amino" includes mono-lower alkyl substituted amino and di-(lower alkyl) substituted amino groups, wherein lower alkyl is as defined above. Among the preferred alkyl amino groups are included methylamino, N,N-diethylamino, ethylamino, N,N-dimethylamino, N-methyl-N-ethylamino.

The term "lower alkanoyloxy" designates lower alkanoyloxy groups wherein lower alkanoyl is defined as above. Among the preferred "lower alkanoxyloxy" groups are acetyloxy, caproyloxy, etc., with acetyloxy being especially preferred.

The term "aroyloxy" designates "aroyloxy" groups wherein "aroyl" is defined as above. The preferred aroyloxy group is benzoyloxy.

When one of $R_1$ and $R_2$ or one of $R_8$ or $R_9$ is a substituted lower alkoxy group, the lower alkoxy group can be substituted with a hydroxy, halogen, lower alkoxy, carboxyl, lower alkoxycarbonyl, amino, mono or di-(lower alkyl)-substituted amino, lower alkoxy carbonyl, mono or di-(lower alkyl)-substituted amino carbonyl.

The compounds of Formula I and their salts are useful as blood pressure lowering agents and appetite inhibiting agents. These compounds also exhibit an action on circulation. The compounds of Formula I above, as well as their salts, are used in the form of conventional pharmaceutical preparations which contain said compounds in connection with conventional pharmaceutical organic or inorganic materials suitable for internal administration. The pharmaceutical compositions containing the compounds of Formula I above, as well as their salts can be administered parenterally or orally. Dosages can be adjusted to indvidual requirements, for example, these compounds can be administered in dosages of from about 1 mg./kg. to about 100 mg./kg. per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid dosage forms such as tablets, dragées, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They also can contain other therapeutically useful materials.

The compounds of Formula I above, in the form of their free acids are amphoteric in character. These compounds readily dissolve in water as well as in acid or in alkali in which they form salts.

In accordance with this invention, the compounds of Formula I and their pharmaceutically acceptable salts exhibit the aforementioned beneficial therapeutic properties. The compounds of Formula I form pharmaceutically acceptable salts with both inorganic and organic pharmaceutically acceptable acids as well as bases. Among the acids which the compounds of Formula I form pharmaceutically acceptable acid addition salts are included hydrochloric acid, hydrobromic acid, sulfuric acid, phosphoric acid, citric acid, acetic acid, succinic acid, maleic acid, methane sulfonic acid, p-toluene sulfonic acid and the like. Such acid addition salts are also within the scope of the invention.

The compounds of Formula I also form pharmaceutically acceptable basic salts. Among the pharmaceutically acceptable basic salts of the compound of Formula I are included the alkali metal salts such as sodium or potassium or the alkaline earth metal salts such as calcium.

The compounds of Formula I above are practically non-toxic to vertebrates. For instance, these compounds, when administered orally to mice have an $LD_{50}$ of about 4,000 mg./kg. The effectiveness of these compounds as blood pressure reducing agents is seen by the fact that when 300 mg. of 3-formyl-L-tyrosine is administered p.o. to hypertonic rats within a 24-hour period, the blood pressure of the rats was reduced by 12%.

The compound of Formula I can, if desired, be converted to dopa and analogs thereof which are useful anti-Parkinson and blood pressure lowering agents by oxidative rearranging of the compound of the Formula I via a Dakin or Baeyer-Villiger reaction. If the oxydation is carried out under neutral or acid conditions, a compound of the formula

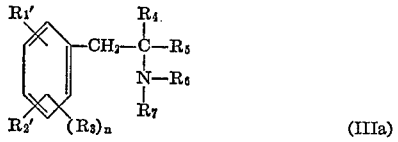

(IIIa)

wherein $R_3$, $R_4$, $R_5$, $R_6$, $R_7$ and $n$ are as above;
and $R_1'$ and $R_2'$ are ortho or para to each other;
and $R_2'$ and $R_1'$ is

and the other is hydroxy, lower alkoxy or substituted lower alkoxy is obtained.

The compound of Formula IIa is then hydrolyzed to form dopa or analogs of the formula

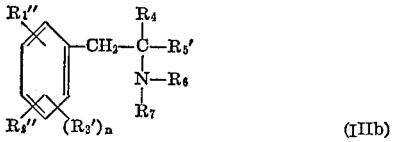

(IIIb)

wherein $R_4$, $R_6$, $R_7$ and $n$ are as above; and $R_1''$ and $R_2''$ are ortho or para to each other; and $R_1''$ or $R_2''$ is hydroxy and the other is hydroxy, lower alkoxy or substituted lower alkoxy; and $R_3'$ is hydrogen, hydroxy, lower alkoxy, lower alkyl or halogen; and $R_5'$ is hydrogen, carboxyl, amino carbonyl or mono or di-(lower alkyl) substituted amino carbonyl.

The compounds of the Formula IIIb can be obtained directly in case the oxydative rearrangement of compounds of the Formula I is carried out under alkaline conditions.

Where the compound of Formula IIIa is a racemate and it is desired to obtain the dopa compound in its D or L form, the compound of Formula IIIa or its hydrolyzed product of Formula IIIb can be resolved. These racemates can be resolved into the optical antipodes by utilizing conventional methods of resolving. A particularly preferred method of resolving the compound of Formula IIIa or its hydrolyzation product of Formula IIIb is by the use of an optically active acid such as tartaric acid or an optically active base such as quinone or brucine.

In preparing dopa and its derivatives, it is generally preferred to use as a starting material, a compound of the Formula I wherein the substituents $R_1$ and $R_2$ are either in the 3- or 4-position and one of $R_1$ and $R_2$ is hydroxy and the other is formyl, $R_3$, $R_4$, $R_6$ and $R_7$ are hydrogen and $R_5$ is carboxyl or a lower alkoxycarbonyl substituent.

The compound of Formula I is converted to the compound of Formula IIIa by oxidizing the compound of the Formula I with hydrogen peroxide or a derivative thereof. Any conventional derivative of hydrogen peroxide such as the organic or inorganic peroxides can be utilized in carrying out this reaction. Of the organic peroxides, the perorganic acids are generally utilized. Any conventional perorganic acid can be utilized in carrying out this reaction. Among the conventional perorganic acids which can be utilized are included peracetic acid, pertifluoroacetic acid, m-chloroperbenzoic acid, or perphthalic acid, with peracetic acid being preferred. Any conventional inorganic peracid can be utilized. Among the conventional inorganic peracids which can be utilized, Caro's acid (permonosulfuric acid) and peroxydisulfuric acid are generally preferred. The especially preferred inorganic peracid is Caro's acid.

The conversion of the compounds of the Formula I to compounds of the Formula IIIa can take place in water or in alkaline medium or in acidic medium. Hydrogen peroxide is conventionally employed in an alkali medium, especially in aqueous caustic soda. Peracetic acid is preferably employed in an acidic medium, preferably dilute acetic acid. On the other hand, Caro's acid is generally employed in water. In carrying out this oxidation reaction, temperature and pressure are not critical and this reaction can be carried out at room temperature and atmospheric pressure. However, if desired, higher or lower temperatures can be utilized. Generally, this reaction is carried out at a temperature of from 0–70° C. When hydrogen peroxide or Caro's acid is utilized as the oxidizing agents, temperatures of from about 0–50° C. are generally preferred. When peracetic acid is utilized as the oxidizing agents, temperatures of from about 0–70° C. are generally preferred.

The formyloxy group in the compound of Formula IIIa can be converted to a hydroxy group by conventional hydrolysis or saponification procedures. These saponification procedures can be carried out by treating the compound of Formula IIIa with an aqueous acid or aqueous alkali at a temperature of below 30°. If a basic medium is utilized, it is preferred to utilize aqueous sodium hydroxide or potassium hydroxide at room temperature.

Any aminocarbonyl, mono(lower alkyl)-substituted aminocarbonyl or di(lower alkyl)-substituted aminocarbonyl group denoted by the symbol $R_5$ as well as any lower alkanoyl or aroyl groups denoted by the symbols $R_6$ and $R_7$ which may have been present in the compounds of Formula IIIa remain unaffected by the saponification carried out utilizing temperatures below 30° C. to saponify the formyloxy group.

Any alkoxycarbonyl group denoted by the symbol $R_5$ which may be present is saponified in an alkaline medium under the conditions described in connection with the saponification of the formyloxy group. On the other hand, this alkoxycarbonyl group remains unaffected in an acidic medium under the aforementioned temperature conditions. In the latter connection, the alkoxycarbonyl group as well as any aminocarbonyl, mono (lower alkyl)-substituted aminocarbonyl or di(lower alkyl)-substituted aminocarbonyl group denoted by the symbol $R_5$ and any lower alkanoyl or aroyl group denoted by the symbols $R_6$ and $R_7$ which may be present can be split off by means of a dilute aqueous mineral acid at a temperature above 30° C., preferably at the boiling point of the mixture.

The compounds of Formula I and their salts are prepared by formylating a compound of the Formula II or a salt thereof.

The compound of Formula I so obtained wherein $R_5$ is either a lower alkoxycarbonyl, aminocarbonyl, mono(lower alkyl)-substituted aminocarbonyl or di(lower alkyl)-substituted aminocarbonyl group can be converted into a compound of Formula I where $R_5$ is carboxyl. The compound of Formula I where $R_5$ is carboxyl can be esterified or amidated to form a compound of Formula I wherein $R_5$ is either lower alkoxycarbonyl, aminocarbonyl, or lower alkyl substituted aminocarbonyl. The compound of Formula I where $R_6$ is lower alkanoyl or aroyl can be converted into a compound of Formula I where $R_6$ is a hydrogen atom. The compound of Formula I where one of $R_1$ or $R_2$ and/or $R_3$ represents a lower alkoxy group can be converted into a compound of Formula I where one of $R_1$ or $R_2$ and/or $R_3$ is hydroxy. The compound of Formula I where one of $R_1$ or $R_2$ and/or $R_2$ is hydroxy can be etherified to form the compound of Formula I where one of $R_1$ or $R_2$ and/or $R_3$ is lower alkoxy. If desired a free base or amino-acid of Formula I can be converted into a salt. If desired, when the compound of Formula I is a racemate, this racemate can be resolved into its optical antipodes.

The starting materials of Formula II hereinbefore belong to a known class of compounds and can be prepared according to known methods.

Especially useful starting materials of Formula II are those which are present in L- or D,L-form. The preferred starting materials of Formula II are those in which the symbol $R_3$ represents a hydrogen atom. Of these preferred starting materials, those in which one of the symbols $R_8$ and $R_9$ represents a hydrogen atom and the other symbol represents a hydroxy group are especially preferred.

Particularly preferred starting materials of Formula II and particularly preferred products of Formula I are summarized in the following table.

TABLE

| Starting material | Product |
| --- | --- |
| N-acetyl-3-[p-(methoxycarbonyl-methoxy)-phenyl]-L-alanine methyl ester. | N-acetyl-3-[3-formy1-4-(methoxy-carbonyl-methoxy)-phenyl]-L-alanine methyl ester. |
| N-acetyl-3-(p-methoxy-phenyl)-L-alanine. | N-acetyl-3-(3-formy 1-4-methoxy-phenyl)-L-alanine. |
| N-acethl-3-(p-methoxy-phenyl)-L-alanine ethyl ester. | N-acetyl-3-(3-formyl-4-methoxy-phenyl)-L-alanine ethyl ester. |
| N-(α-ethyl-m-methoxy-phenethyl)-benzamide. | N-(α-ethyl-4-formyl-3-methoxy-phenethyl)-benzamide. |
| α-ethyl-m-methoxy-phenethyl-amine. | 4-(2-amino-butyl)-2-methoxy-benzaldehyde hydrochloride. |
| N-benzoyl-(3,4-dimethoxy-phenyl)-L-alanine ethyl ester. | N-benzoyl-(3,4-dimethyl-6-formyl-phenyl)-L-alanine ethyl ester. |

From N - acetyl - 3-(3-formyl-4-methoxy-phenyl)-L-alanine ethyl ester mentioned as a product in the foregoing table there is obtained in a subsequent step (e.g., by treatment with hydrochloric acid) 3-(3-formyl-4-methoxy-phenyl)-L-alanine hyrochloride or, by treatment with, for example, boron trichloride, N-acetyl-3-formyl-L-tyrosine ethyl ester. By treatment of the latter compound with, for example, hydrochloric acid there is obtained 3-formyl-L-tyrosine hydrochloride. From N-acetyl - 3-(3-formyl-4-methoxy-phenyl)-L-alanine ethyl ester, with, for example anhydrous aluminum chloride there is obtained N-acetyl-3-formyl-L-tyrosine. The compounds obtained by these subsequent operations, which are described in more detail hereinafter, are also preferred.

The formylation in accordance with the process of this invention, which is effected with retention of the optical activity of the starting material used, is preferably carried out by reacting a starting material of Formula II with a formylating agent in the presence of a Lewis acid or an inorganic or organic acid halide. Any conventional formylating agents can be utilized in carrying out this step. Especially suitable formylating agents are formic acid esters, orthoformic acid esters, formyl chloride (which may be formed in situ from carbon monoxide and hydrochloric acid), dihalomethyl lower alkyl ethers (especially dichloromethyl lower alkyl ethers such as dichloromethyl methyl ether), hydrocyanic acid, symmetrical triazine, dimethylformamide or other amides of formic acid. Among the preferred amides of formic acid are mono and dilower alkyl amides of formic acid. Also, when an ester of formic or orthoformic acid is utilized, the lower alkyl esters of formic acids or orthoformic acids are generally preferred.

Any conventional Lewis acid can be utilized in carrying out this conversion. Lewis acids which can expediently be used are zinc halides such as zinc chloride, aluminum halides such as aluminum chloride, titanium halides such as titanium tetrachloride, iron trihalides such as iron trichloride and tin halides such as tin tetrachloride. Halides of the most varied inorganic and organic acids (for example, phosphorus oxychloride and methanesulfochloride) can be used as the acid halide.

The formylation can be carried out in the absence of a further solvent when the formylating agent is used in excess. On the other hand, the formylation can also be carried out in the presence of an inert solvent; for example, in the presence of nitrobenzene, carbon tetrachloride, methylene chloride or chloroform. Any conventional inert organic solvent can be utilized, if desired, in carrying out this reaction. The temperature at which the formylation is carried out can vary within a very wide range. An especially suitable temperature at which to carry out the formylation is a temperature which lies at between about minus 50° C. and the reflux temperature of the mixture. This preferred temperature essentially depends on the nature of the substitution present on the phenyl ring of the starting material of Formula II.

The compounds of Formula I obtained after the formylation can, if desired, be subjected to the operations described hereinafter in any desired sequence, it being possible that several of these operations can proceed simultaneously.

A compound of Formula I where $R_5$ is lower alkoxycarbonyl, aminocarbonyl, mono(lower alkyl)-substituted aminocarbonyl or di(lower alkyl)-substituted aminocarbonyl can be converted into a compound of Formula I where $R_5$ is carboxyl. This operation can be effected in conventional manner by saponification with an aqueous alkali or aqueous acid. Any conventional method of saponification can be utilized in carrying out this reaction.

A compound of Formula I where $R_5$ is a carboxyl group can be esterified or amidated to form the compound of Formula I where $R_5$ is a lower alkoxycarbonyl, aminocarbonyl, mono(lower alkyl)-substituted aminocarbonyl or di(lower alkyl)-substituted aminocarbonyl group. This esterification or amidation can be carried out in a manner known per se with the usual esterification or amidation agents.

A compound of Formula I where $R_6$ is a lower alkanoyl or aroyl group can be converted into a compound of Formula I where $R_6$ is a hydrogen atom. This operation can be carried out according to saponification methods which are known per se.

A compound of Formula I wherein one of $R_1$ or $R_2$ and/or $R_3$ is a lower alkoxy group, can be converted into a compound of Formula I wherein one of $R_1$ or $R_2$ and/or $R_3$ represents a hydroxy group. This operation can be effected in a conventional manner by treatment with a Lewis acid (for example, aluminum chloride, boron trichloride or the like) or with hydrobromic acid.

A compound of Formula I wherein one of $R_1$ or $R_2$ and/or $R_3$ represents a hydroxy group can be etherified according to methods which are known per se; for example, by reaction with an alkyl halide or alkyl sulfate in the presence of an acid-binding agent. By this reaction, the compound of Formula I is produced wherein at least one of $R_1$ or $R_2$ and/or $R_3$ is a lower alkoxy group.

Free amino-acids of Formula I obtained are amphoteric. With bases, the carboxyl group of these compounds can form the corresponding salts. The amino group of the compounds of Formula I is capable of forming acid addition salts. These salts can be obtained by reaction with inorganic and organic acids; for example, hydrochloric acid, sulfuric acid, phosphoric acid, acetic acid, oxalic acid, succinic acid or the like.

Racemates of Formula I obtained can be resolved into their optical antipodes according to conventional methods; for example, with an optically active acid such as tartaric acid or an optically active base such as quinine or brucine.

The amines provided by the present invention (that is to say, the compounds of Formula I and their salts), especially those which exist in the L- and D,L-form, display pharmacodynamic actions. They especially exhibit an action on the circulation. They can be used as hypotensive agents and as appetite-inhibiting agents.

The following examples are illustrative but not limitative of the invention. All temperatures are in degrees centigrade.

Example 1

To a solution of 86.8 g. of N-(acetyl-3-[p-<(methoxycarbonyl)methoxy>phenyl] - L - alanine methyl ester in 1130 ml. of nitrobenzene, there are first added dropwise with stirring 51.2 ml. of dichloromethyl methyl ether then 123 ml. of titanium tetrachloride. The mixture is then stirred at room temperature and after 1.5 and after 3 hours here are again added 51.2 ml. each time of dichloromethyl methyl ether. After the reaction solution has been stirred at room temperature for a further 3 hours, it is cooled to +5° C. and slowly poured with external ice-cooling into 280 ml. of 3 N hydrochloric acid. 4,000 ml. of ethyl acetate and 2,000 ml. of tetrahydrofuran are then added. The mixture is neutralized by introduction of 950 g. of anhydrous potassium carbonate with stirring and dried with sodium sulphate. After filtration, the ethyl acetate and the tetrahydrofuran are evaporated off and the residue is again diluted with 1,500 ml. of ethyl acetate and shaken once with 700 ml. and once with 100 ml. of an aqueous sodium bisulphite solution (38° Bé.) for 15 minutes each time. The combined bisulphite extracts are treated with 1,400 g. of sodium carbonate and 3,000 ml. of water and extracted twice with 4,000 ml. of acetic ester each time. By evaporation of the extracts, there are obtained 35.9 g. of N-acetyl-3-[3-formyl-4-<(methoxycarbonyl)methoxy>-phenyl]-L-alanine methyl ester; melting point 147–148° C.

Example 2

54.7 g. of N-acetyl-L-tyrosine methyl ester was dissolved in 460 ml. of dimethylformamide. To this solution, there was also added a slurry of 5.55 g. of sodium hydride in 10 ml. of dimethylformamide. After this 42.5 bromo acetic acid ethyl ester was added and the reaction mixture was heated for 30 minutes to 50° C. The reaction mixture was evaporated to dryness. The residue was taken up in 400 ml. of water. The water solution was extracted into ethyl acetate. From the extract, there was obtained N-acetyl-3[p-L-(methoxy - carbonyl)-methoxy-phenyl]-L-alanine methyl ester by adsorption on Kieselgel. The compound had a melting point of 110 to 117° C. after crystallization from ethyl acetate.

Example 3

4.38 ml. of titanium tetrachloride are rapidly added dropwise to a suspension of 2.37 g. of N-acetyl-3-(p-methoxyphenyl)-L-alanine in 40 ml. of nitro-benzene, the temperature rising to 40° and there resulting a dark-brown solution. It is cooled to 30°, 1.82 ml. of dichloromethyl methyl ether are added dropwise in the course of 10 minutes and the mixture is further stirred for 20 minutes. The reaction mixture is then poured onto 20 ml. of ice-cold 5 percent hydrochloric acid and extracted three times with 150 ml. of ethyl acetate each time. The product is isolated from the ethyl acetate phase by extraction with sodium bicarbonate solution, acidification of the extract with concentrated hydrochloric acid and renewed extraction with ethyl acetate. By evaporation, 1.03 g. of N-acetyl-3-(3-formyl - 4 - methoxy-phenyl)-L-alanine are obtained as an oil. This compound upon crystallization from ethyl acetate had a melting point of 128–129° C.

Example 4

167 ml. of titanium tetrachloride are added with stirring in the course of 5 minutes to a solution of 100 g. of N-acetyl-3-(p-methoxy-phenyl)-L-alanine ethyl ester in 1,500 ml. of nitrobenzene, the temperature rising to 38° C. The mixture is cooled to +23° C. and then 69.4 ml. of dichloromethyl methyl ether are added in the course of 3 minutes. The mixture is then stirred at room temperature for 2 hours. The reaction solution is then cooled to +5° and poured with stirring into 380 ml. of ice-cold 3 N aqueous hydrochloric acid. 4,000 ml. of ethyl acetate and 2,000 ml. of tetrahydrofuran are added. The mixture is then neutralized by introduction of 1,200 g. of anhydrous potassium carbonate with stirring, and dried with sodium sulphate. After filtration, the mixture is evaporated (finally in high vacuum at 70° C.). The residue, dissolved in 500 ml. of methylene chloride, is applied to a chromatography column with 2,000 g. of Kieselgel. Elution with ethyl acetate-methylene chloride (1:1 v./v.) yields, after evaporation, 75.6 g. of N-acetyl-3-(3-formyl-4-methoxy-phenyl)-L-alanine ethyl ester which can be further purified by recrystallization from ethyl acetate-hexane; M.P. 100–101° C.; $[\alpha]_D^{25} = +24.0°$ (c.=1.0; in 95 percent ethanol).

Example 5

160 g. of N - acetyl-3-(p-methoxy-phenyl)-L-alanine were dissolved in 1,600 ml. of absolute ethanol. The above solution was saturated with dry hydrogen chloride gas. The temperature of the solution was kept at 20 to 22° C. by cooling. After this the reaction mixture was evaporated to dryness. The residue was taken up in ethyl acetate. The extract was washed in saturated aqueous sodium bicarbonate solution, dried over sodium sulfate and evaporated to dryness under vacuum. The resulting N-acetyl-3-(p-methoxy-phenyl)-L-alanine-ethyl ester after crystallization from hexane ethyl acetate solvent mixture has a melting point of 93 to 94° C.

Example 6

A mixture of 1.0 g. of N-acetyl-3-(3-formyl-4-methoxyphenyl)-L-alanine ethyl ester and 20 ml. of 3-N-hydrochloric acid is heated at reflux in an argon atmosphere for 2 hours, then evaporated to dryness under reduced pressure. Crystallization of the residue from boiling isopropyl alcohol yields pure 3-(3-formyl-4-methoxy-phenyl)-L-alanine hydrochloride which does not melt up to 300° C.; $[\alpha]_D^{25} = -6.8°$ (c.=1.0; in water).

Example 7

A solution of 41.6 g. of N-acetyl-3-(3-formyl-4-methoxy-phenyl)-L-alanine ethyl ester in 350 ml. of nitrobenzene is introduced in the course of 7 minutes at 25° C. into a solution of 166 g. of boron trichloride in 700 ml. of nitrobenzene. The reaction solution is stirred at 25° C. for 2 hours. 350 ml. of methylene chloride are then added and 350 ml. of water are added dropwise with cooling in the course of 30 minutes at +5° C. The mixture is filtered, the filter residue is rinsed with methylene chloride, the methylene chloride phase in the filtrate is separated off and the aqueous phase is extracted again with methylene chloride. The organic phases are combined, washed with aqueous sodium bicarbonate solution, dried and evaporated (finally in high vacuum at 70° C.). By recrystallization of the crystalline residue from ethyl acetate-hexane there are obtained 21.8 g. of pure N-acetyl-3-fromyl-L-tyrosine ethyl ester; melting point 117–118° C.; $[\alpha]_D^{25} = +15.8°$ (c.=1.0; in 95 percent ethanol).

Example 8

A mixture of 30.0 g. of N-acetyl-3-formyl-L-tyrosine ethyl ester and 715 ml. of 3-N-hydrochloric acid is heated at reflux in an argon atmosphere with stirring for 2 hours, then evaporated to dryness under reduced pressure. By recrystallization of the residue from 300 ml. of 18 percent hydrochloric acid with the addition of active charcoal there are obtained 16.0 g. of pure 3-formyl-L-tyrosine hydrochloride which does not melt up to 350°; $[\alpha]_D = -5.5$ (c.=1.0 percent; in water).

Example 9

A solution of 2.67 g. of anhydrous aluminum chloride and 1.46 g. of N-acetyl-3-(3-formyl-4-methoxy-phenyl)-L-alanine ethyl ester in 20 ml. of nitrobenzene is stirred at 90–92° C. for an hour. The reaction mixture is then introduced into a mixture of 20 g. of ice and 3 ml. of concentrated hydrochloric acid and extracted three times with 300 ml. of ethyl acetate each time. The carboxylic acid is isolated from the extracts with sodium bicarbonate solution, which is subsequently acidified and again extracted with ethyl acetate. Drying of the extract, evaporation and recrystallization of the residue from ethyl acetate-hexane yields pure N-acetyl-3-formyl-L-tyrosine; melting point 133–134° C.

Example 10

11.75 ml. of titanium tetrachloride are allowed to flow into a solution of 7.58 g. of D, L-N-(α-ethyl-m-methoxy-phenethyl)-benzamide in 107 ml. of nitrobenzene, the temperature rising to 40°. The mixture is cooled to +22° C., 3.66 ml. of dichloro-methyl methyl ether are added and the mixture is further stirred at room temperature for one hour. The reaction solution is then cooled to +2° C. and poured onto 60 ml. of ice-cold hydrochloric acid. The mixture is extracted three times with 500 ml. of ethyl acetate each time. The extracts are washed with 3 N aqueous hydrochloric acid and with aqueous sodium carbonate solution, dried with sodium sulphate and evaporated (finally in high vacuum at 70° C.). By recrystallization of the crystalline residue from ethyl acetate-hexane there are obtained 4.3 g. of pure D,L-N-(α-ethyl-4-formyl-3-methoxy-phenethyl)-benzamide; melting point 166–168° C.

Example 11

To a mixture containing 117 g. of lithium aluminum hydride in 1,800 ml. diethyl ether and 900 ml. of tetrahydrofuran, there was added while stirring a solution of 68.8 g. of m-[2-nitro-1-butenyl]-anisole in 1,800 ml. of tetrahydrofuran. The reaction mixture was heated for 3 hours at 50° C. The unreacted lithium aluminum hydride was decomposed by the addition of water. The solution was filtered and the filtrate was evaporated to dryness under vacuum. There remained D,L-α-ethyl-m-methoxy phenylethylamine, which boiled after rectification at 87° C., 0.3 mm. Hg.

Example 12

14.7 g. of D,L-α-ethyl-m-methoxy-phenethylamine was dissolved in 73 ml. of pyridine. To the solution there was added while stirring, 9.5 ml. of benzoyl chloride. After addition, the solution was allowed to stand for 2 hours at 25° C. under constant stirring. The reaction mixture was then evaporated to dryness under vacuum and the residue was taken up in diethyl ether. The extract was washed first with a solution of sodium hydroxide and then with hydrochloric acid.: It was then dried over sodium sulfate and evaporated to dryness under vacuum. The remaining D,L-N-[α-ethyl-m-methoxy-phenylethyl] benzamide melted after crystallization from a mixture of ethyl acetate and hexane at 102–103° C.

Example 13

23.25 ml. of titanium tetrachloride are added to a solution of 9.5 g. of D,L-α-ethyl-m-methoxy-phenethyl-amine in 210 ml. of nitrobenzene, the temperature rising to 40° C. The mixture is cooled to 22° C., 7.25 ml. of dichloromethyl methyl ether are added and the mixture is stirred at room temperature for an hour. The reaction solution is then poured onto 120 ml. of ice-cold 3 N aqueous hydrochloric acid. The mixture is extracted three times with 500 ml. of ethyl acetate each time and then the aqueous phase is evaporated under reduced pressure. The residue is twice taken up in an isopropanol-toluene mixture and again evaporated under reduced pressure. The residue thus obtained is extracted with hot isopropanol. D,L-4-(2-aminobutyl)-2-methoxybenzaldeyhde hydrochloride of melting point 123° C. crystallizes from the extract.

Example 14

8.5 ml. of tin tetrachloride are added dropwise in 10 minutes to a solution, cooled to −30°, of 17.8 g. of N-benzoyl-(3,4-dimethoxyphenyl)-L-alanine ethyl ester and 6 ml. of dichloromethyl methyl ether in 50 ml. of methylene chloride. The mixture is then gradually warmed to room temperature with stirring. The dark green solution is poured onto 150 ml. of ice-water, then extracted twice with 100 ml. of ethyl acetate each time. The organic phases are exhaustively extracted with saturated aqueous sodium carbonate solution, and then, after drying over magnesium sulfate, evaporated at 40°/20 mm. Hg. The residual crude N-benzoyl-(3,4-dimethoxy-6-formyl-phenyl)-L-alanine ethyl ester (15.2 g./80 percent) is recrystallized from ethyl acetate-petroleum ether. Melting point 142–143° $[\alpha]_D^{25} = -36.8$ (c.=1 percent MeOH).

Example 15

35 g. of N-benzoyl-3-methoxy-L-tyrosine was dissolved in 50 ml. of methanol and thereafter was added dropwise 112 g. of dimethyl sulfate. After this there was added dropwise under constant stirring at a temperature of 35°–46° C., a solution containing 72 g. of sodium hydroxide in 280 ml. of water. The reaction mixture was allowed to stand for 1 hour at room temperature while stirring. After this, hydrochloric acid was added and the mixture was then extracted with ethyl acetate. The extract was evaporated to dryness under reduced pressure. The residue N-benzoyl-3-(3,4-dimethoxy-phenyl)-L-alanine, had a melting point after crystallization from butyl acetate and petroleum ether of 172° C.

Example 16

16.5 g. N-benzoyl-3-(3,4-dimethoxy-phenyl)-L-alanine was dissolved in 50 ml. of absolute ethanol. To the solution at the boiling temperature there was added dry hydrogen chloride gas until the solution was saturated. The reaction mixture was then heated at boiling for 1 hour. After this, the reaction mixture was evaporated to dryness under vacuum. The residue N-benzoyl-3-(3,4-dimethoxy-phenyl)-L-alanine ethyl ester melted after crystallization from petroleum ether at a temperature of from 90–91° C.

Example 17

Manufacture of tablets of the following composition:

| | Mg. |
|---|---|
| N-acetyl-3-formyl-L-tyrosine ethyl ester | 100 |
| Lactose | 61 |
| Corn starch | 30 |
| Polyvinylpyrrolidone | 4 |
| Talcum | 5 |

The active substance is mixed with the lactose and the corn starch and, after addition of a solution of polyvinylpyrrolidone in 40 ml. of ethanol, granulated. The granulate is dried at 30° C., mixed with talcum and pressed to tablets.

| | Mg. |
|---|---|
| Individual weight of one tablet | 200 |
| Active substance content of one tablet | 100 |

We claim:
1. N-benzoyl-(3,4-dimethoxy - 6-formyl-phenyl)-L-alanine ethyl ester.
2. N-acetyl-3-(3-formyl - 4-methoxy-phenyl)-L-alanine ethyl ester.
3. N-acetyl-3-formyl-L-tyrosine ethyl ester.

References Cited
Finar, I. L.: Organic Chemistry (1963), pub. by Richard Clay and Co., England (QD251F56), pp. 656–657 relied on.

LORRAINE A. WEINBERGER, Primary Examiner

L. A. THAXTON, Assistant Examiner

U.S. Cl. X.R.

260—477, 479 R, 519, 558 R, 559 A, 562 A, 570.8 R; 424—309, 311, 319, 324, 330